United States Patent [19]

Briggs

[11] 3,968,675
[45] July 13, 1976

[54] METHOD AND APPARATUS FOR PREPARING A MASS SPECTROMETER LEAK DETECTOR SYSTEM FOR OPERATION

[75] Inventor: Walton E. Briggs, Lynnfield, Mass.
[73] Assignee: Varian Associates, Palo Alto, Calif.
[22] Filed: June 7, 1974
[21] Appl. No.: 477,248

[52] U.S. Cl. .............................. 73/1 G; 73/40.7; 250/288; 250/282
[51] Int. Cl.² .................................... G01M 3/04
[58] Field of Search ............ 73/40.7, 1 G; 250/288, 250/282

[56] References Cited
UNITED STATES PATENTS

| | | | |
|---|---|---|---|
| 2,486,199 | 10/1949 | Nier | 73/40.7 |
| 3,616,680 | 11/1971 | Schrader | 73/40.7 |
| 3,626,760 | 12/1971 | Briggs | 73/40.7 |
| 3,690,151 | 9/1972 | Briggs | 73/40.7 |
| 3,762,212 | 10/1973 | Morley et al. | 73/40.7 |

Primary Examiner—James J. Gill
Assistant Examiner—Anthony V. Ciarlante
Attorney, Agent, or Firm—Stanley Z. Cole; Leon F. Herbert

[57] ABSTRACT

A leak detector system comprising a mass spectrometer tuned to detect the presence of helium test gas is prepared for operation by reference to the partial pressure of helium in air.

6 Claims, 3 Drawing Figures

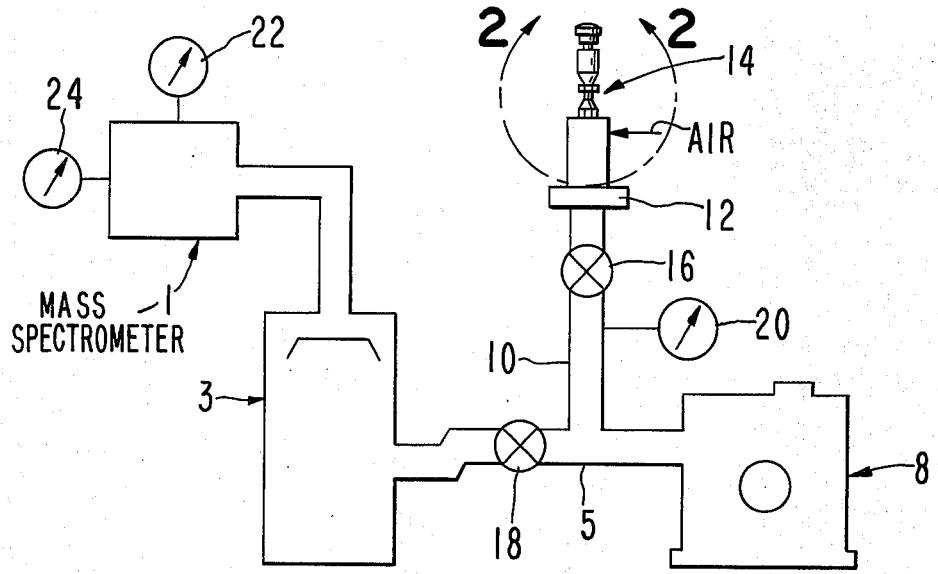
FIG.1
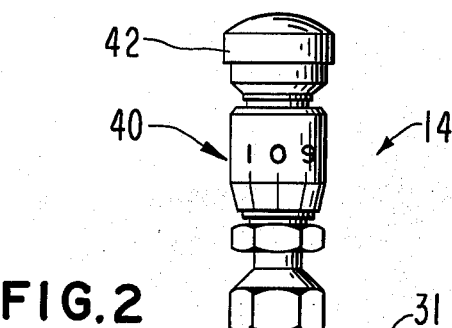
FIG.2
FIG.3
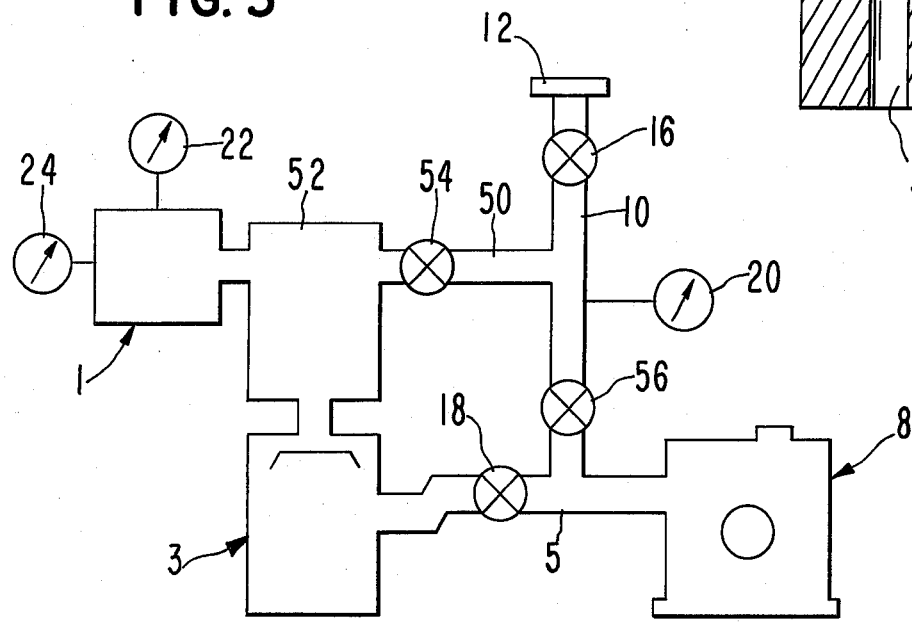

3,968,675

METHOD AND APPARATUS FOR PREPARING A MASS SPECTROMETER LEAK DETECTOR SYSTEM FOR OPERATION

BACKGROUND OF THE INVENTION

Leak detector systems having mass spectrometers tuned to detect the presence of a test gas which is indicative of a leak are well known. U.S. Pat. No. 3,690,151 discloses such a system in which helium test gas passes through a gas sample inlet into a mass spectrometer via a high vacuum pump associated with the mass spectrometer. A detectable portion of the helium test gas passes through the high-vacuum pump in the direction opposite to the flow of gas being pumped from the mass spectrometer. This reverse flow is attributed to the high velocity, small size and chemical inactivity of the helium atoms, which enables large numbers of them to escape the pumping action of the high-vacuum pump. The above-identified patent also discloses as prior art therein a leak detection system in which the helium test gas passes to the mass spectrometer without going upstream through a high vacuum pump.

The output reading of the mass spectrometer provides an indication of the existence of a leak. In order to prepare the above-described system for operation, it has heretofore been the practice to provide communication between the gas sample inlet and a so-called "standard leak" which comprises a container of substantially pure helium gas, a porous-to-helium membrane, and a valve, all of which is capable of providing a controlled flow rate of helium. The helium introduced into the mass spectrometer by the standard leak is used to tune and calibrate the mass spectrometer. The problem is that standard leaks are expensive, and particularly so if they were made in a size sufficient to provide enough helium to tune a system in which the helium must pass upstream through a high vacuum pump so only a portion of it reaches the mass spectrometer.

SUMMARY OF THE INVENTION

It is an object of the present invention to provide a method and apparatus for preparing a mass spectrometer leak detection system for operation without requiring an expensive standard leak as was heretofore required.

It is a more specific object of this invention to provide a method and apparatus for preparing a mass spectrometer leak detection system for operation by reference to the partial pressure of helium in air.

BRIEF DESCRIPTION OF THE DRAWING

FIG. 1 shows in schematic view a leak detection system according to this invention;

FIG. 2 shows an enlarged detailed view of the needle valve indicated by the line 2—2 of FIG. 1; and FIG. 3 shows in schematic view another leak detection system according to the invention.

DETAILED DESCRIPTION OF THE INVENTION

A preferred embodiment of a leak detection system according to this invention is shown schematically in FIG. 1 in which a conventional mass spectrometer 1 is connected to the inlet port of a conventional oil diffusion pump 3. The outlet of the diffusion pump is connected by a foreline 5 to a conventional roughing pump 8. An inlet line 10 is connected to the foreline 5. The upper, or inlet, end of the inlet line is provided with a conventional coupling 12. An air inlet valve 14 forms a basic aspect of this invention and is attached to coupling 12 in FIG. 1. A conventional line valve 16 is located in the inlet line, and a conventional line valve 18 is located in the foreline, between the inlet line 10 and the diffusion pump 3. A conventional total pressure vacuum gauge 20 is connected to the inlet line between valves 16 and 18. A conventional total pressure vacuum gauge 22 is connected to the mass spectrometer 1. A conventional read-out device such as a meter 24 is connected to the output of the mass spectrometer to indicate the presence or absence of helium in the spectrometer.

In use of the system shown in FIG. 1 for the purpose of detecting leaks, it is operated in conventional manner such as the following. Roughing pump 8 is operated, with valve 16 closed and valve 18 open, until the system is rough pumped. Then the high vacuum pump 3, typically a diffusion pump, is operated until the total pressure in the mass spectrometer is low enough, as shown on gauge 22, to operate the mass spectrometer, at which time the mass spectrometer is turned on. Then the air inlet valve 14 is removed, if it is already in place, and the inlet fitting 12 is connected to a conventional leak test arrangement as disclosed in U.S. Pat. No. 3,690,151. Valve 18 is now closed and valve 16 is then opened. When gauge 20 indicates a pressure below approximately 0.2 torr, valve 18 is opened. If the item being leak checked with helium has a leak, helium test gas will pass through it and the presence of helium will be shown on the mass spectrometer output meter 24.

In preparing the system of FIG. 1 prior to operation in checking for leaks in test pieces, the air valve 14 is connected to the inlet fitting 12. As shown in detail in FIG. 2, the air valve 14 comprises a body 30 having an air inlet port 31 and a passage 33 for connecting port 31 to the inlet line 10 of the system. Passage 33 has a restricted portion 35 which receives a tapered valve needle 37 to provide a closely controllable restricted passage. Valve needle 37 is attached to a conventional micrometer drive mechanism 40 which is threaded into the valve body 30. Thus, when knob 42 on the drive mechanism is rotated, the valve needle 37 is moved vertically in restriction 35.

The procedure for preparing the system prior to operation in checking for leaks in test pieces is as follows. The system is pumped down as previously described for leak-checking operation prior to the point of opening valve 16. Air valve 14 is attached to coupling 12 if it is not already in place. The needle valve 14 should be closed before opening valve 16 in order to protect the system from an excess air flow. The next step is to close valve 18 and open valve 16 to pump down the space between valves 16 and 14 until an equilibrium pressure is reached as shown by gauge 20. Then valve 14 is opened and adjusted until the pressure reading on gauge 20 is a stable known value such as 0.1 torr. Then valve 18 is reopened.

Since the total pressure in foreline 5 is now known from gauge 20 and since it is also known that the percentage of helium in atmospheric air is one part in 200,000, the partial pressure of helium in the foreline is easily calculated. For example, with a total pressure of 0.1 torr in the foreline, the helium partial pressure in the foreline is 1/200,000 × 0.1 torr or $0.5 \times 10^{-7}$ torr. As previously mentioned, the high vacuum pump 3 is of a type which permits helium to pass upstream through the pump to some extent. The compression ratio for helium for such a pump is known and usually is adjustable. For example, an oil diffusion pump with a given heater setting is known to have a diffusion ratio of 100 to 1 for helium. Thus, with such a ratio it is known that the helium partial pressure in the mass spectrometer is $1/100 \times 5.0 \times 10^{-7}$ torr or $5 \times 10^{-9}$ torr. This is ample helium partial pressure for preparing a conventional mass spectrometer for operation since it is sensitive to helium quantity as small as helium partial pressure of $3 \times 10^{-12}$ torr.

It is now possible to "tune" the mass spectrometer. This is a conventional procedure known in the art. Once helium is being introduced into the mass spectrometer, either by a standard leak or by the present invention, the procedure basically is to adjust the mass spectrometer until it reaches maximum sensitivity for the atomic mass corresponding to helium. In other words, the mass spectrometer is tuned to give the highest possible output reading for the quantity of helium present in the spectrometer. In order to tune the mass spectrometer, it is not necessary to know the partial pressure of helium therein but it is necessary to have a quantity of helium well above the spectrometer's minimum sensitivity. Within the limit of mass spectrometer and its meter 24, the more helium in the mass spectrometer, the better for ease and accuracy of tuning.

In addition to the previously described use in tuning the mass spectrometer, the present invention also provides a means for "calibrating" the mass spectrometer. The invention provides a known partial pressure of helium in the mass spectrometer as described in connection with the tuning procedure. For example, with the values given for the tuning procedure, the helium partial pressure in the mass spectrometer is known to be $5.0 \times 10^{-9}$ torr. Thus, calibration is simply a matter of adjusting the mass spectrometer output meter 24 to read $5.0 \times 10^{-9}$ torr when that helium partial pressure is known to exist in the mass spectrometer. If calibration is performed in a room where excess helium may exist, the needle valve inlet port 31 should be connected to relatively pure air. One simple means for obtaining pure air is to insert one end of a flexible hose (not shown) into the inlet port 31, and passing the other end of the hose through the wall of the room to an area of relatively pure air, preferably to the outside of the building.

As previously explained, the preferred embodiment of the invention is shown in FIG. 1 in which the helium passes upstream through a high vacuum pump 3. An alternative arrangement is one in which the helium is introduced to the mass spectrometer without first passing through the high vacuum pump. One such alternative arrangement is shown in FIG. 3 in which the same elements as in FIG. 1 are given the same reference numbers. FIG. 3 is different from FIG. 1 in that gas in the inlet line 10 communicates with the mass spectrometer 1 through a branch inlet line 50 and a conventional cold trap 52. A conventional line valve 54 is located in branch inlet line 50, and a similar valve 56 is located in line 10 between line 50 and line 5.

The system of FIG. 3 is pumped down for preparation, or for operation in the leak-testing mode, in conventional manner similar to that described for FIG. 1. More specifically, the roughing pump 8 is started with valves 16 and 54 closed and valves 18 and 56 open. Then pump 8 is operated to obtain a pressure of about .2 torr on gauge 20. Next pump 3 is operated until the total pressure in the mass spectrometer is low enough, as shown on gauge 22, to operate the mass spectrometer, at which time the mass spectrometer is turned on.

For preparation of the system, air valve 14 is placed on fitting 12 and is closed. Then valve 18 is closed and valve 16 is opened to pump the space between it and valve 14 until gauge 22 again reads about .2 torr. Next valve 18 is reopened and valve 56 is closed. Then valve 54 is opened. At this point, the total pressure in the mass spectrometer should be in the $10^{-5}$ torr range.

Next valve 14 may be slowly opened. Since the pressure of air in present day mass spectrometers should not exceed about $2.0 \times 10^{-4}$ torr, the air valve 14 should not be opened beyond the amount to provide that pressure as read on gauge 22. Assuming valve 14 is adjusted to maintain a total pressure of $2.0 \times 10^{-4}$ torr in the mass spectrometer, the partial pressure of helium in the mass spectrometer will be $2.0 \times 10^{-4}$ torr times 1/200,000 (the helium ratio in air) or $1.0 \times 10^{-9}$ torr. Since the helium does not pass upstream through the high vacuum pump 3 in FIG. 3, the helium partial pressure in the mass spectrometer is not reduced from the value present in inlet line 10. Calibration and tuning are performed with the system of FIG. 3 in the same manner as with the system of FIG. 1, except that the known partial pressure of helium in the mass spectrometer will be less with the system of FIG. 3. The reason why a higher partial pressure of helium can be obtained with the system of FIG. 1 without having a damagingly high total pressure in the mass spectrometer, is that helium can pass upstream through pump 3 much more readily than the other constituent elements of air.

Since various modifications can be made within the scope of the invention, it is limited only by the appended claims. For example, air valve 14 can be adjusted to admit air to provide total pressures and helium partial pressures different from the specific values given herein, as long as the total pressure in the mass spectrometer is not allowed to reach a value which would damage the mass spectrometer and the partial pressure of helium in the mass spectrometer is high enough to be detected by the mass spectrometer.

What is claimed is:

1. A method of preparing a mass spectrometer leak detector system for operation in testing for leaks, said method comprising the steps of establishing in said mass spectrometer a reduced pressure and then introducing substantially pure atmospheric air into said air system to provide in said mass spectrometer a partial pressure of the helium in said air sufficient to be detectable by said mass spectrometer while preventing the introduction of said air into the system in an amount which will damage said mass spectrometer.

2. A method as claimed in claim 1 wherein helium in the air introduced into the system is passed upstream through a diffusion pump to reach the mass spectrometer.

3. A method as claimed in claim 1 wherein helium in the air introduced into the system is passed to the mass spectrometer upstream through a pump which is less effective in pumping helium than it is in pumping other constituents of air.

4. A method as claimed in claim 1 comprising the step of tuning the mass spectrometer with said helium provided therein.

5. A method as claimed in claim 1 comprising determining the partial pressure of said helium in the mass spectrometer based on helium presence in air in the ratio of 1 part of helium per 200,000 parts of air.

6. A method as claimed in claim 5 comprising the step of calibrating said mass spectrometer based on the determined partial pressure of helium therein.

* * * * *